United States Patent [19]

Hardy, Sr.

[11] Patent Number: 5,452,863
[45] Date of Patent: Sep. 26, 1995

[54] SEAT BELT RETRACTOR SHAFT

[75] Inventor: Russell L. Hardy, Sr., New Haven, Mich.

[73] Assignee: TRW Vehicle Safety Systems Inc., Lyndhurst, Ohio

[21] Appl. No.: 252,329

[22] Filed: Jun. 1, 1994

[51] Int. Cl.⁶ ................................................. B60R 22/34
[52] U.S. Cl. ................... 242/376; 242/613.4; 242/587.1
[58] Field of Search ................... 242/376, 376.1, 242/379.1, 407, 587.1, 609.1, 613.4, 613.5; 280/806, 807; 297/475–478

[56] References Cited

U.S. PATENT DOCUMENTS

| | | |
|---|---|---|
| 3,432,115 | 3/1969 | Stoffel et al. . |
| 3,790,099 | 2/1974 | Beller . |
| 4,119,281 | 10/1978 | Paitula et al. . |
| 4,385,736 | 5/1983 | Yamamoto ............................ 242/376 |
| 4,967,976 | 11/1990 | Kawai et al. ............................ 242/376 |
| 5,002,236 | 3/1991 | Cotter . |
| 5,014,927 | 5/1991 | Ogawa et al. . |

FOREIGN PATENT DOCUMENTS 3150948  12/1982  Germany ............................ 242/376

*Primary Examiner*—John M. Jillions
*Attorney, Agent, or Firm*—Tarolli, Sundheim & Covell

[57] ABSTRACT

A vehicle seat belt webbing retractor (10) includes a frame (40) and a spool (32) on which belt webbing (16) is wound. The spool (32) has a longitudinal axis (64) about which the spool rotates in a belt withdrawal direction (86) and in an opposite belt retraction direction (88). A shaft (34) supports the spool (32) on the frame (40) for rotation about the axis (64). The shaft (34) has at least a pair of tubular portions (154, 156) which extend parallel to the axis (64) and which are longitudinally coextensive along the axis. The tubular portions (154, 156) extend between spaced side walls (48, 50) of the frame (40). The tubular portions (154, 156) provide increased bending strength for the shaft (34).

19 Claims, 4 Drawing Sheets

SEAT BELT RETRACTOR SHAFT

BACKGROUND OF THE INVENTION

1. Technical Field

The present invention relates to a vehicle seat belt webbing retractor, and in particular relates to a shaft for supporting a spool on which seat belt webbing is wound.

2. Description of the Prior Art

Vehicle seat belt retractors which have a plastic spool and a metal reinforcing member in the spool are known. The spool is supported for rotation by a frame of the retractor. Belt webbing is wound on the spool and is extensible about a vehicle occupant. In the event of sudden deceleration such as occurs in a vehicle collision, the vehicle occupant may tend to move relative to the vehicle and place a tensile force on the belt webbing. This tensile force is transmitted through the plastic spool and into the metal reinforcing member. The metal reinforcing member experiences a bending moment.

SUMMARY OF THE INVENTION

The present invention is a vehicle seat belt webbing retractor comprising a frame and a spool on which seat belt webbing is wound. The spool has a longitudinal axis about which the spool rotates in a belt withdrawal direction and in an opposite belt retraction direction. A shaft extends through the spool. The shaft has at least a pair of tubular portions which extend generally parallel to the axis and which are spaced laterally from each other along the axis.

The tubular portions of the shaft provide the shaft with a substantial bending strength. Thus, the shaft has substantial resistance to bending or distortion. Alternatively, the shaft can be made with less material and have the same amount of bending strength as a flat metal shaft. This can reduce the weight of the retractor.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF THE PREFERRED EMBODIMENT OF THE INVENTION

Figure 1:
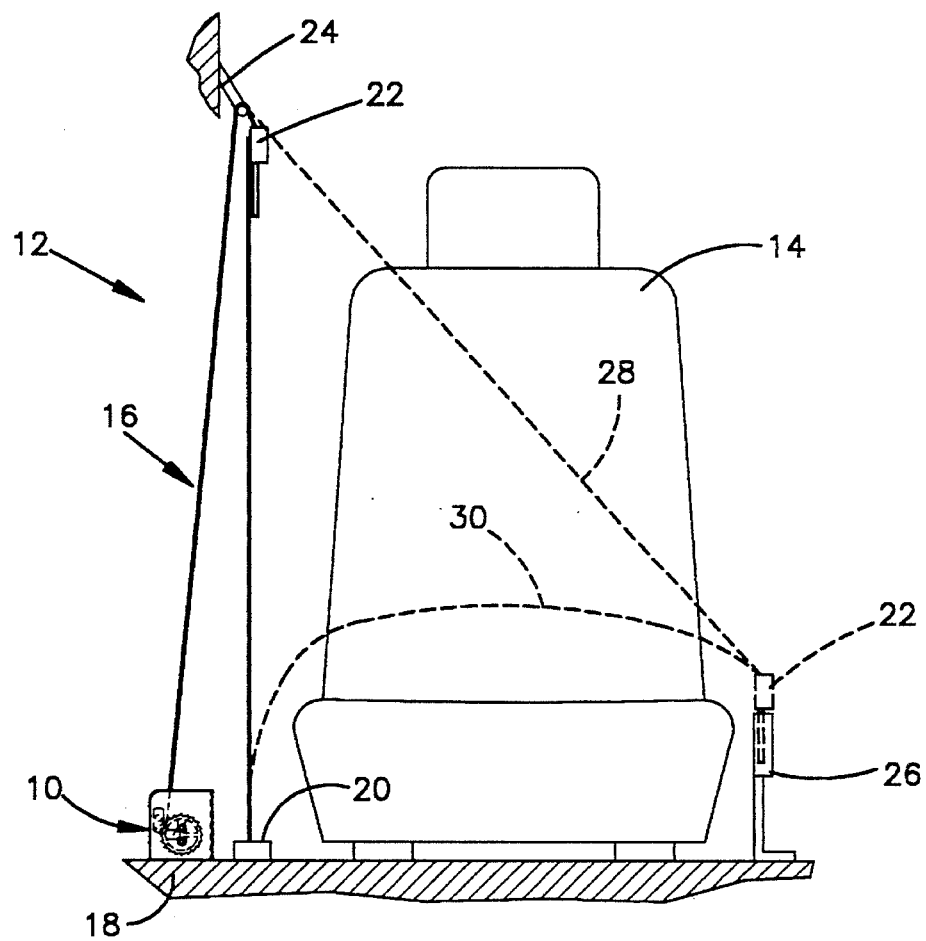
FIG. 1 is a schematic illustration of a vehicle seat belt system including a seat belt webbing retractor in accordance with the present invention.
Figure 5:
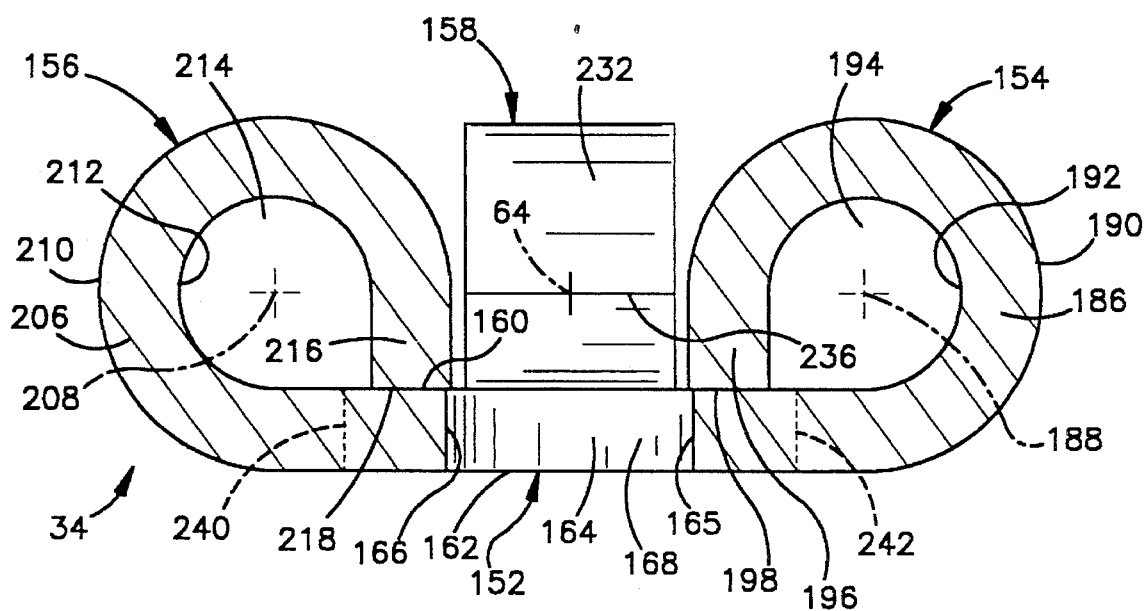
FIG. 5 is a transverse sectional view of the shaft of the retractor of FIG. 1, taken in a direction along line 5—5 of FIG. 3.

The present invention relates to a vehicle occupant restraint and, in particular, to a vehicle seat belt webbing retractor. The present invention is applicable to various seat belt webbing retractor constructions. As representative of the present invention, FIG. 1 illustrates a vehicle seat belt webbing retractor 10. The retractor 10 is incorporated in a three-point continuous loop seat belt system 12 for use in restraining an occupant of a vehicle.

During operation of the vehicle, an occupant of the vehicle sits on a seat 14 which is illustrated as a front passenger seat in the vehicle. A length of belt webbing 16 is extensible about the vehicle occupant. One end of the length of belt webbing 16 is anchored to the vehicle body 18 at an anchor point 20 located on one side of the seat 14. The opposite end of the belt webbing 16 is attached to the retractor 10 which is secured to the vehicle body on the same side of the seat 14. Intermediate its ends, the belt webbing 16 passes through a tongue assembly 22 and a D-ring 24 that is located above the retractor 10 and the anchor point 20. When the seat belt system 12 is not in use, the belt webbing 16 is wound on the retractor 10 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 10. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28 which extends across the torso of the occupant and a lap portion 30 which extends across the lap of the occupant.

The retractor 10 (FIG. 2) includes a generally cylindrical spool 32 on which the belt webbing 16 is wound. The spool 32 is supported by a shaft 34 having one end supported on a ratchet 36 and the other end supported on a spring driver 38. The ratchet 36 and the spring driver 38 are journalled for rotation in a frame 40 of the retractor 10.

Figure 2:
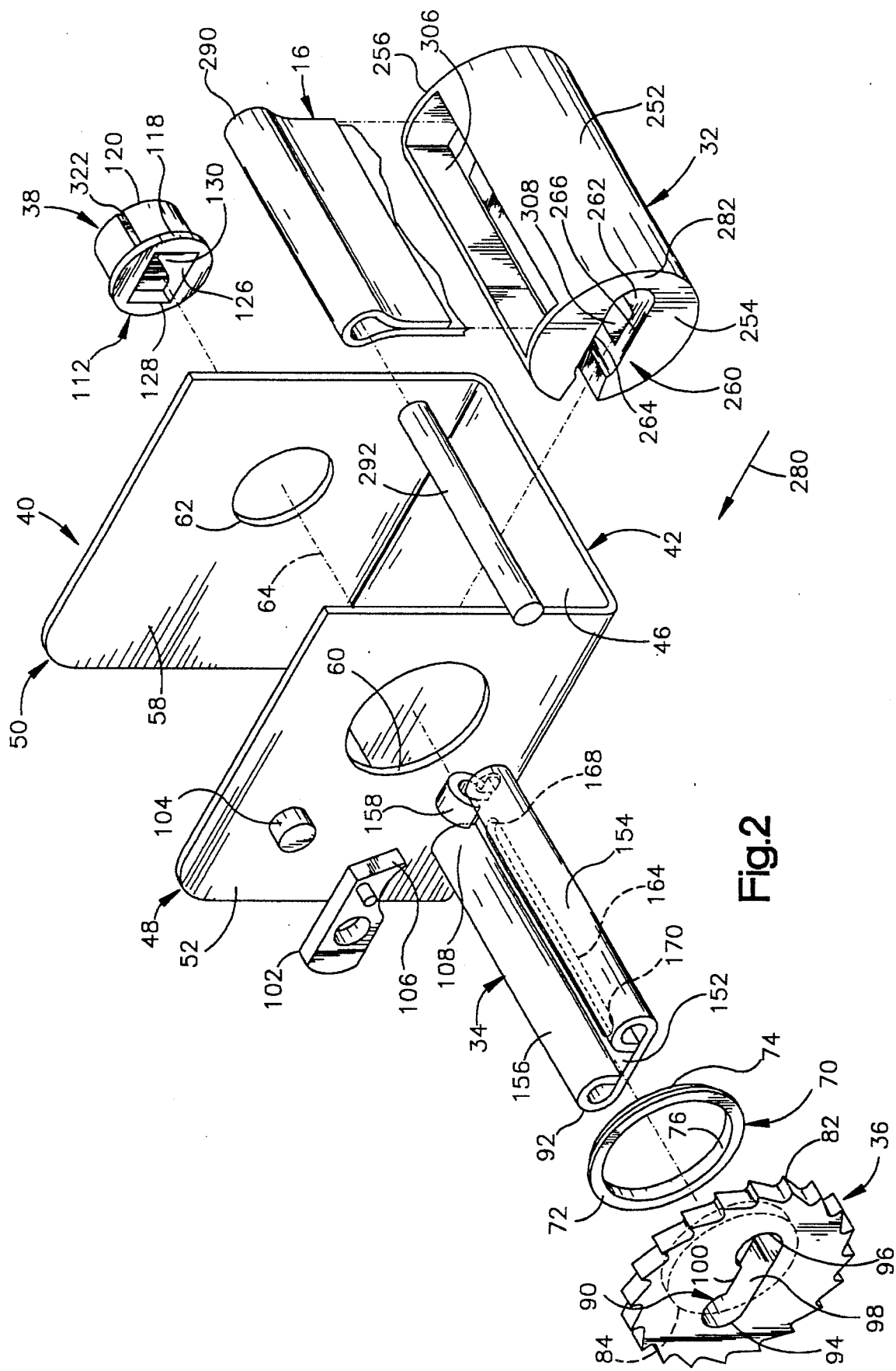
FIG. 2 is an exploded perspective view of the retractor of FIG. 1.
Figure 3:
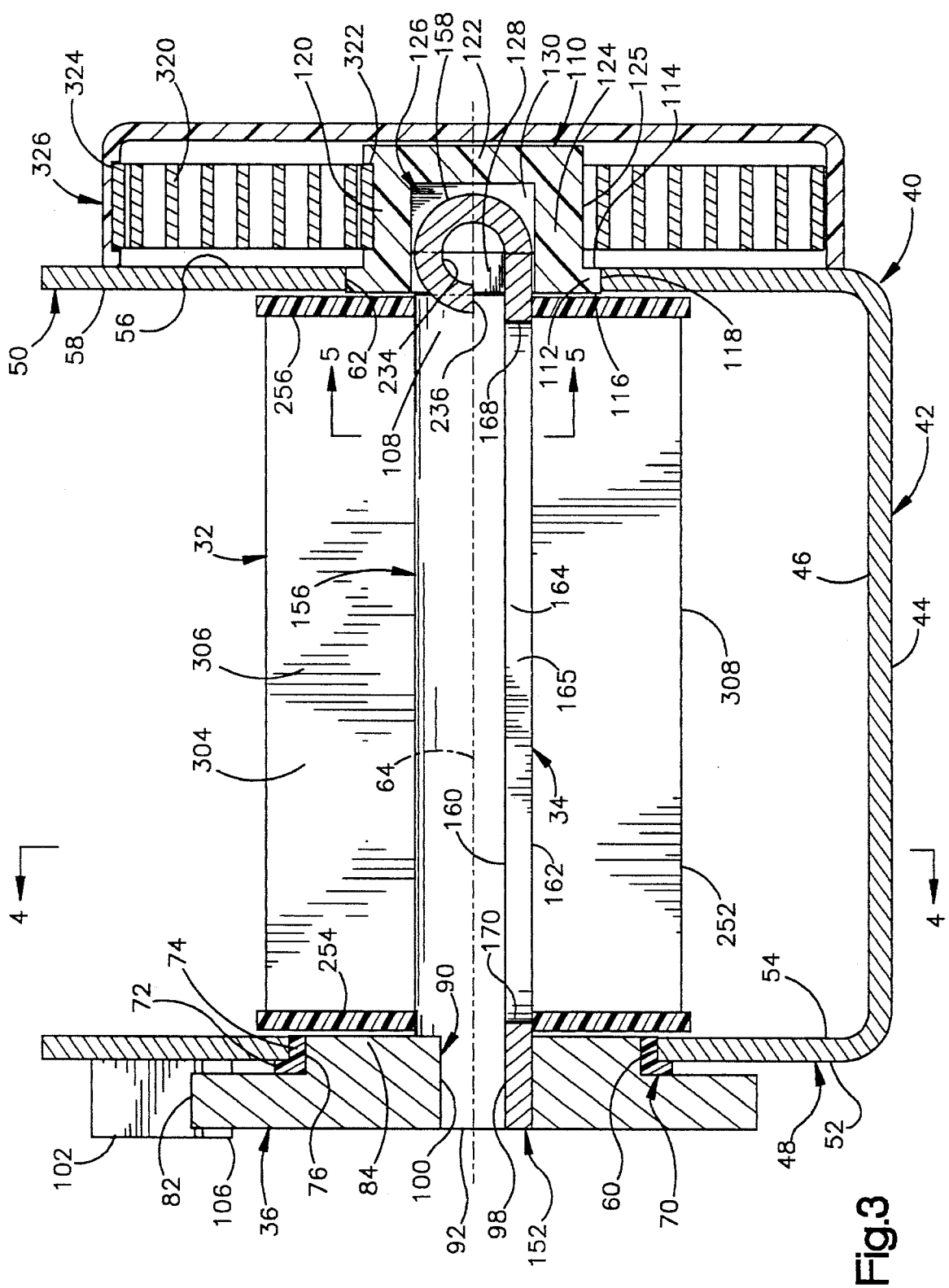
FIG. 3 is a longitudinal sectional view of the retractor of FIG. 1 with parts including the seat belt webbing removed.

The retractor frame 40 is a single piece of sheet metal stamped and formed to a U-shaped configuration as seen in FIGS. 2 and 3. The frame 40 includes a bottom wall 42 having parallel outer and inner side surfaces 44 and 46. The frame 40 also includes spaced parallel side walls 48 and 50 which extend generally perpendicular to the bottom wall 42. The side wall 48 has parallel outer and inner side surfaces 52 and 54. The side wall 50 has parallel outer and inner side surfaces 56 and 58.

A circular opening 60 is formed in one frame side wall 48. A circular opening 62 is formed in the other frame side wall 50. The opening 62 is smaller in diameter than the opening 60. The centers of the circular openings 60 and 62 are disposed on an axis 64 of the retractor 10. The axis 64 extends between the frame side walls 48 and 50 in a direction parallel to the frame bottom wall 42.

The retractor 10 includes an annular plastic bearing 70 (FIGS. 2 and 3) supported on the frame side wall 48. An outer portion 72 of the bearing 70 is disposed in abutting engagement with the outer side surface 52 of the frame side wall 48. A smaller diameter hub portion 74 of the bearing 70 is disposed in the opening 60 in the frame side wall 48. The bearing 70 has an annular inner peripheral bearing surface 76.

The ratchet 36 (FIGS. 2 and 3) is a circular disc-shaped member supported on the bearing 70. A plurality of ratchet teeth 82 are disposed in a circular array on the outer periphery of the ratchet 36. A hub portion 84 of the ratchet 36 engages the bearing surface 76 of the bearing 70. The ratchet 36 is thus journalled in the bearing 70 for rotation about the axis 64. The ratchet 36 is rotatable in a belt withdrawal direction 86 (FIG. 4) and in an opposite belt retraction direction 88.

An opening 90 for receiving a first end portion 92 of the shaft 34 extends axially through the ratchet 36. The opening 90 is defined by a series of interconnected surfaces including two arcuate surfaces 94 and 96. A planar surface 98 extends tangent to and interconnects the arcuate surfaces 94 and 96. Another planar surface 100 extends between the arcuate surfaces 94 and 96 in a direction parallel to the surface 98.

A lock pawl 102 (FIGS. 2–4) is supported on a hub 104 projecting from the outer side surface 52 of the frame side wall 48. The lock pawl 102 has a tooth 106 which is pivotable into and out of engagement with the teeth 82 on the ratchet 36. The lock pawl 102 is normally biased out of engagement with the ratchet teeth 82 and is movable into engagement with the ratchet teeth, in a known manner, to block rotation of the spool 32 in the belt withdrawal direction 86.

The spring driver 38 (FIGS. 2 and 3) supports a second end 108 of the shaft 34 for rotation in the frame side wall 50. The spring driver 38 is a one-piece member made from plastic. A hub portion 112 of the spring driver 38 has parallel outer and inner radially extending side surfaces 114 and 116. An annular outer peripheral surface 118 is disposed in abutting engagement with the surface defining the opening 62 in the frame side wall 50. The hub portion 112 and the spring driver 38 as a whole are thus journalled in the frame side wall 50 for rotation about the axis 64.

A shaft portion 120 of the spring driver 38 projects axially outward from the hub portion 112. The shaft portion 120 includes a circular radially extending end wall 122 and a peripheral wall 124 having a cylindrical outer surface 125. The walls 122 and 124 define an opening 126 in the spring driver 38. The opening 126 has a generally rectangular cross-sectional configuration as seen in FIG. 2. The opening 126 includes a larger inner portion 128 disposed farther from the end wall 122, and a smaller outer portion 130 disposed closer to the end wall.

The retractor shaft 34 (FIGS. 2–5) extends between and is supported by the ratchet 36 and the spring driver 38. The shaft 34 is formed from a single piece of sheet metal of uniform thickness having portions curled to the illustrated configuration. Specifically, the shaft 34 includes generally a planar connector portion 152 disposed laterally between two tubular portions 154 and 156 formed by curling the edges of the piece of sheet metal. The tubular portions 154 and 156 are longitudinally co-extensive with each other along the axis 64. The tubular portions 154 and 156 are spaced laterally from each other on opposite sides of the axis 64. The shaft 34 also includes an end curl 158.

The connector portion 152 of the shaft 34 has parallel planar upper and lower side surfaces 160 and 162. A webbing slot 164 extends through the connector portion 152 between the upper and lower side surfaces 160 and 162. The webbing slot 164 is defined by two longitudinally extending parallel surfaces 165 and 166 and by two curved end surfaces 168 and 170 joining the side surfaces 165 and 166.

The first tubular portion 154 of the shaft 34 includes a curved wall portion 186 which extends from the connector portion 152 in a circular direction around a longitudinal central axis 188 of the first tubular portion 154. The axis 188 is parallel to and spaced from the axis 64.

The curved wall portion 186 has parallel cylindrical inner and outer peripheral surfaces 192 and 190. The curved wall portion 186 defines a generally cylindrical bore 194 extending for the entire length of the first tubular portion 154 of the shaft 34. The radius of the bore 194, that is, the radial distance from the axis 188 to the inner peripheral surface 192, is equal to the wall thickness of the wall portion 186.

The curved wall portion 186 terminates in a straight end portion 196 which extends perpendicular to the connector portion 152. The end portion 196 has a planar end surface 198 in abutting engagement with the planar upper surface 160 of the connector portion 152, thus closing the first tubular portion 154.

The second tubular portion 156 of the shaft 34 is a mirror image of the first tubular portion 154. The second tubular portion 156 includes a curved wall portion 206 which extends from the connector portion 152 in a circular direction around a longitudinal central axis 208 of the second tubular portion 156. The axis 208 is parallel to and spaced from the axis 64. The axis 208 is also coplanar with the axis 64 and with the axis 188.

The curved wall portion 206 has cylindrical inner and outer peripheral surfaces 212 and 210. The curved wall portion 206 defines a generally cylindrical bore 214 which extends for the entire length of the second tubular portion 156 of the shaft 34. The radius of the bore 214, that is, the radial distance from the axis 208 to the inner surface 212, is equal to the wall thickness of the tubular portion 156.

The curved wall portion 206 terminates in a straight end portion 216 which extends perpendicular to the connector portion 152. The end portion 216 has a planar end surface 218 disposed in abutting engagement with the planar upper surface 160 of the connector portion 152, thus closing the second tubular portion 156.

The end curl 158 of the shaft 34 projects axially at the second end 108 of the shaft. The end curl 158 is a narrow upward curled portion of the single piece of sheet metal of which the shaft 34 is formed. The end curl 158 extends axially outward from the connector portion 152, curls up, and then curls back axially inward and down toward the connector portion. The end curl 158 has an outer peripheral surface 232 and an inner peripheral surface 234 (FIG. 3). An end surface 236 of the end curl 158 is spaced from and extends parallel to the upper side surface 160 of the shaft connector portion 152.

A pair of rectangular locator tabs 240 and 242 project axially from the end of the connector portion 152 on either side of the end curl 158. The locator tabs 240 and 242 are formed as an extension of and are co-planar with the connector portion 152.

The first end portion 92 (FIG. 2) of the shaft 34 is press fit into the opening 90 in the ratchet 36. The opening 90 has a configuration which matches that of the shaft 34. Thus, the flat lower surface 98 of the opening 90 is in abutting engagement with the lower side surface 162 of the shaft connector portion 152. The cylindrical outer surface 190 of the first tubular portion 154 is in abutting engagement with the circular surface 94 in the ratchet 36. The cylindrical outer surface 210 of the second tubular portion 156 is in abutting engagement with the circular surface 96 in the ratchet 36. The planar surface 100 of the opening 90 extends between the first and second tubular portions 154 and 156 of the shaft 34. By virtue of the press fit engagement between the shaft end 92 and the ratchet 36, the shaft 34 is thus fixed for rotation with the ratchet.

The opposite end 108 of the shaft 34 is press fit into the spring driver 38. The end curl 158 of the shaft 34 is received in the outer portion 130 of the opening 124 in the spring driver 38. The locator tabs 240 and 242 of the shaft 34 are received in the inner portion 128 of the opening 124 in the spring driver 38. By virtue of the press fit engagement between the shaft end 108 and the spring driver 38, the shaft 34 is fixed for rotation with the spring driver.

The retractor spool 32 (FIGS. 2–4) is mounted on the shaft 34 for rotation with the shaft. The spool 32 is a molded plastic member having a generally cylindrical outer peripheral surface 252 centered on the axis 64. The spool 32 has parallel radially extending circular end walls 254 and 256.

The shaft 34 is disposed in a radially extending side slot 260 in the spool 32. The side slot 260 has a radially inner and wider portion 262 defined generally by two parallel surfaces 264 and 266. The surfaces 264 and 266 are spaced apart by a distance selected to provide a secure engagement between the shaft 34 and the spool 32.

The side slot 260 also has a radially outer and narrower throat portion 270 defined by opposed spaced apart surfaces 272 and 274 of the spool 32. The surfaces 272 and 274 are spaced apart by a distance selected to block movement of the shaft 34 out of the spool 32 in the direction 280 (FIG. 2). A resilient neck portion 282 (FIG. 2) of the spool 32 which is diametrically opposite the throat portion 270 enables the surfaces 272 and 274 to be spread apart temporarily so that the spool 32 can be assembled over the shaft 34 in the direction indicated by the arrow 280. When the shaft 34 moves into the wider portion 262 of the slot 260, the spool surfaces 272 and 274 snap back to their original position blocking movement of the shaft 34 out of the spool 32.

The spool 32 includes parallel spaced apart surfaces 302 and 304 extending perpendicular to the shaft connector portion 152. The surfaces 302 and 304 define between them a webbing insertion slot 306. The spool also includes parallel spaced apart surfaces defining a webbing exit slot 308 which is diametrically opposite the webbing insertion slot 306.

Figure 4:
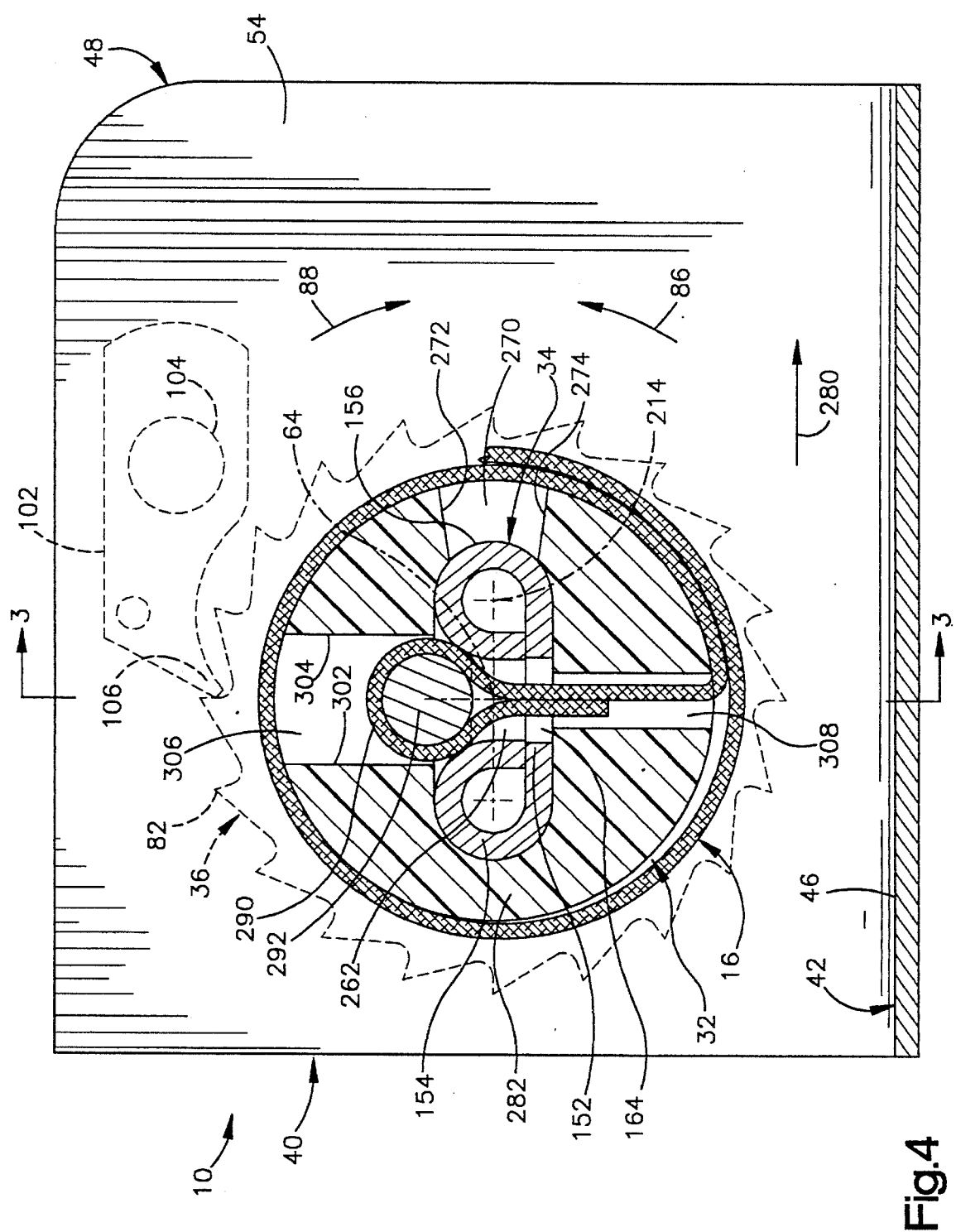
FIG. 4 is a transverse sectional view of the retractor of FIG. 1 taken along line 4—4 of FIG. 3 and showing the seat belt webbing.

As best seen in FIGS. 2 and 4, an end portion of the belt webbing 16 is folded over and sewn to form a webbing loop 290. A cylindrical webbing pin 292 extends through the webbing loop 290. During assembly of the retractor 10, a leading end portion (not shown) of the belt webbing 16 is inserted through the webbing insertion slot 306, through the webbing slot 164 in the shaft 34, and exits the spool 32 through the exit slot 308. The assembled webbing loop 290 and webbing pin 292 are drawn into the webbing insertion slot 306 and bottom out on the first and second tubular shaft portions 154 and 156, as seen in FIG. 4. The length of belt webbing 16 wraps around the periphery 252 of the spool 32 and exits from the retractor 10 as illustrated in FIG. 1.

The retractor 10 includes a spiral rewind spring 320 (FIG. 3) having an inner end portion received in a slot 322 on the exterior of the spring driver 38. An outer end portion of the rewind spring 320 is received in a slot 324 in a spring housing 326 extending axially from the frame side wall 50. The rewind spring 320 biases the spool 32 for rotation in the belt retraction direction 88 about the axis 64. A ratchet cover (not shown) similar to the spring housing 326 may be connected with the frame side wall 52 to cover the ratchet 36 and the lock pawl 102, as is known in the art.

In the event of sudden deceleration such as occurs in a vehicle collision, the lock pawl 102 and the ratchet 36 cooperate in a known manner to block rotation of the spool 32 in the belt withdrawal direction 86. Forward movement of the vehicle occupant relative to the vehicle applies a tensile force to the belt webbing 16. Force is transmitted from the belt webbing 16 through the spool 32 and the shaft 34 into the retractor frame 40. A bending moment is placed on the shaft 34, because the ends 92 and 108 of the shaft are supported by the frame 40 while the remainder of the shaft, including most of the length of the tubular portions 154 and 156 and the connector portion 152, spans the opening between the frame side walls 48 and 50. The tubular configuration of the shaft portions 154 and 156 resists this bending moment and thus resists bending of the shaft 34. The tubular configuration of the shaft portions 154 and 156 thus provides increased bending strength for the shaft 34, as compared to a shaft made from a flat plate for example.

A retractor shaft having a tubular configuration such as the shaft 34 can be made with a reduced amount of metal and still have the same amount of bending strength as a shaft made from a flat metal plate. This can reduce the weight of the shaft and thereby reduce the weight of the retractor.

In the illustrated retractor 10, one end portion 92 of the shaft 34 is press fit into the ratchet 36, and the other end portion 108 of the shaft is press fit into the spring driver 38. In some known retractors a pair of spool locking ratchets such as the ratchet 36 are connected at opposite ends of the spool. It should therefore be understood that the present invention is not limited to a retractor in which a shaft such as the shaft 34 is press fit into only one ratchet. Rather, the opposite ends of a shaft such as the shaft 34 can be press fit into individual ratchets. In such a case, a flat tab could be stamped from one end portion of the shaft which projects axially beyond its respective ratchet, for connection with a rewind spring mechanism through a part such as the spring driver 38. Alternatively, a rewind spring mechanism could be connected in another manner with the shaft or spool of the modified retractor.

Also in the illustrated retractor 10, the shaft 34 has only two tubular portions, and only one shaft 34 is provided. It may be desirable to configure differently a retractor in accordance with the present invention. For example, two pieces such as the shaft 34 could be connected back to back, with the lower side surfaces 162 of their connector portions 152 being disposed in abutting engagement with each other. This would provide a retractor shaft having four tubular portions.

It should be understood that terms such as "upper" and "lower" are used herein to describe the elements in their position illustrated in the drawings. As the parts of the retractor 10 rotate about the axis 64, these parts change orientation and assume many different positions. A surface described herein as an "upper" surface, for example, may not always be in an "upper" orientation or position. Thus, the use herein of terms such as "upper" and "lower" is solely for convenience of description and is not limiting of the scope of the invention.

From the above description of the invention, those skilled in the art will perceive improvements, changes and modifications in the invention. For example, more than two tubular portions could be provided on the retractor shaft. The tubular portions need not be made as one piece but could be separate pieces joined together. Also, the end curl on the retractor shaft could be eliminated, with the tubular portions extending into the spring driver. Such improvements, changes and modifications within the skill of the art are intended to be covered by the appended claims.

Having described the invention, I claim:

1. A vehicle seat belt webbing retractor apparatus comprising:

a spool on which seat belt webbing is wound, said spool having a longitudinal axis about which said spool rotates in a belt withdrawal direction and in an opposite belt retraction direction; and a shaft extending through said spool, said shaft having at least a pair of tubular portions which extend generally parallel to said axis and which are spaced laterally from each other along said axis.

2. A retractor apparatus as set forth in claim 1 further including a frame including spaced frame walls, said shaft having a first end portion supported on one of said frame walls and a second end portion supported on another one of said frame walls, said tubular portions of said shaft extending between said frame walls.

3. A retractor apparatus as set forth in claim 1 wherein said tubular portions of said shaft are received within an axially extending opening in said spool.

4. A retractor apparatus as set forth in claim 1 wherein said spaced tubular shaft portions define between them a belt webbing slot through which a portion of the belt webbing extends.

5. A retractor apparatus as set forth in claim 1 wherein said shaft includes a generally planar connector portion extending between and interconnecting said tubular portions of said shaft, said connector portion having surfaces defining a webbing slot in said connector portion through which belt webbing is extensible.

6. A retractor apparatus as set forth in claim 1 wherein each one of said tubular portions comprises a tubular wall having abutting surfaces closing said tubular portion and defining a generally cylindrical bore extending through said tubular portion.

7. A retractor apparatus as set forth in claim 1 wherein said shaft is made from one piece of metal having side portions curled and formed into said tubular portions.

8. A retractor apparatus as set forth in claim 1 wherein a first one of said pair of tubular portions has a generally circular cross sectional configuration and comprises a first wall extending in a circular direction around a longitudinal central axis of said first tubular portion, a second one of said pair of tubular portions having a generally circular cross sectional configuration and comprising a second wall extending in a circular direction around a longitudinal central axis of said second tubular portion.

9. A retractor apparatus as set forth in claim 8 wherein said longitudinal central axis of said first tubular portion extends parallel to said longitudinal central axis of said second tubular portion.

10. A retractor apparatus as set forth in claim 9 wherein said axis of said spool is coplanar with said longitudinal central axes of said first and second tubular members.

11. A retractor apparatus as set forth in claim 1 wherein said shaft comprises a generally planar connector portion extending between and interconnecting said tubular portions, said connector portion being disposed in a plane which is spaced from and extends parallel to a plane including longitudinal central axes of said first and second tubular portions.

12. A retractor apparatus as set forth in claim 1 further including a ratchet and a spring driver each journalled for rotation in said frame, said shaft having a first end portion disposed in press fit engagement with said ratchet and a second end portion connected for rotation with said spring driver.

13. A retractor apparatus as set forth in claim 1 wherein said spool includes surfaces defining a radially extending first slot in which said shaft is disposed, and second and third slots which are diametrically opposite each other and through which belt webbing is extensible.

14. A retractor apparatus as set forth in claim 13 wherein said spool has surfaces defining a radially inward relatively wide portion of said first slot in which said shaft is disposed, and wherein said spool also has throat surfaces defining a radially outward relatively narrow throat portion of said first slot, said throat surfaces being spaced apart by a distance selected to block movement of said shaft out of said spool when said shaft is disposed in said spool.

15. A shaft for a vehicle seat belt webbing retractor having a frame and a spool supported by the frame and on which belt webbing is wound, the spool being rotatable relative to the frame about an axis in a belt withdrawal direction and in an opposite belt retraction direction, said shaft comprising:

first and second opposite end portions and an intermediate portion extending between and interconnecting said end portions, said intermediate portion being extensible through the spool in a force-transmitting relationship with the spool, said first and second shaft end portions being supportable on the frame for rotation relative to the frame, said shaft intermediate portion including at least a pair of tubular portions which extend parallel to the axis and which are spaced laterally from each other along the axis.

16. A retractor shaft as set forth in claim 15 comprising a laterally central connector portion disposed intermediate said pair of tubular portions, said connector portion having surfaces defining a webbing slot in said connector portion through which belt webbing is extensible.

17. A retractor shaft as set forth in claim 16 wherein said connector portion extends between said tubular portions in a direction tangential to both of said connector portions.

18. A retractor shaft as set forth in claim 16 wherein said retractor shaft is formed from a single piece of sheet metal.

19. A retractor shaft as set forth in claim 15 wherein said first and second shaft end portions are supportable on spaced apart walls of the frame with said tubular portions of said shaft extending between the frame walls.

* * * * *